Feb. 8, 1927. 1,617,101
A. BUTLER
ALARM DEVICE FOR INDICATING HIGH AND LOW LIQUID LEVEL
Filed April 25, 1924
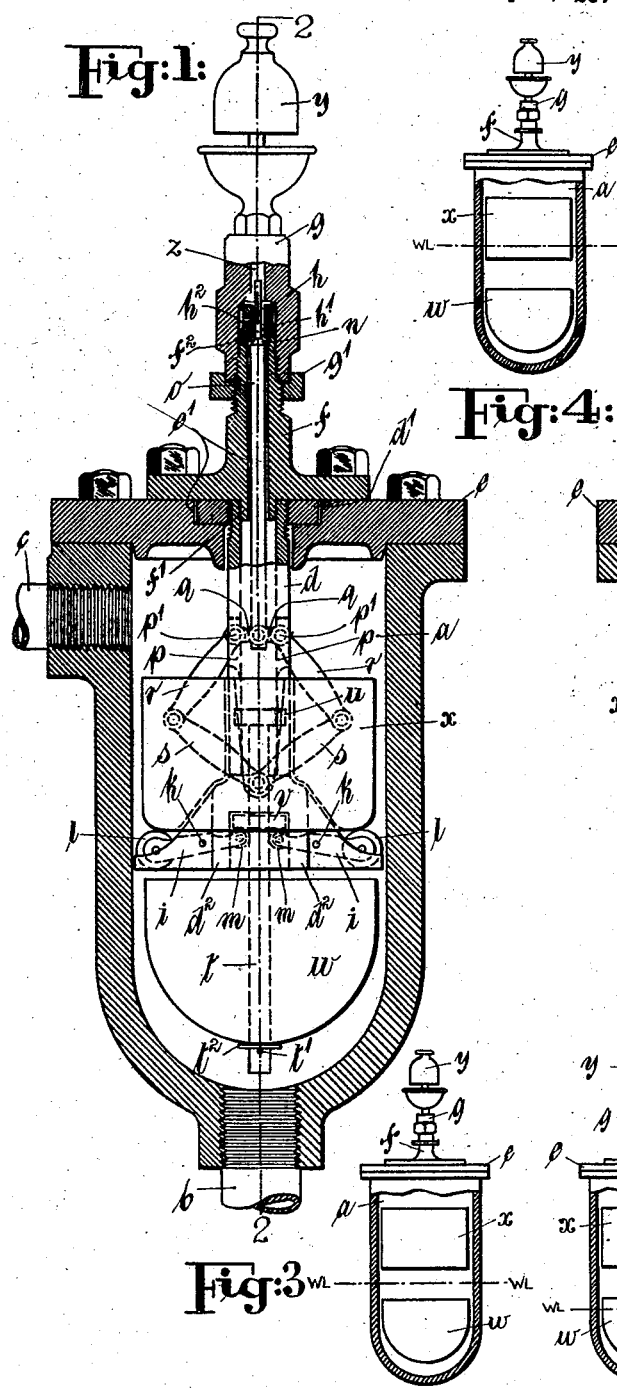
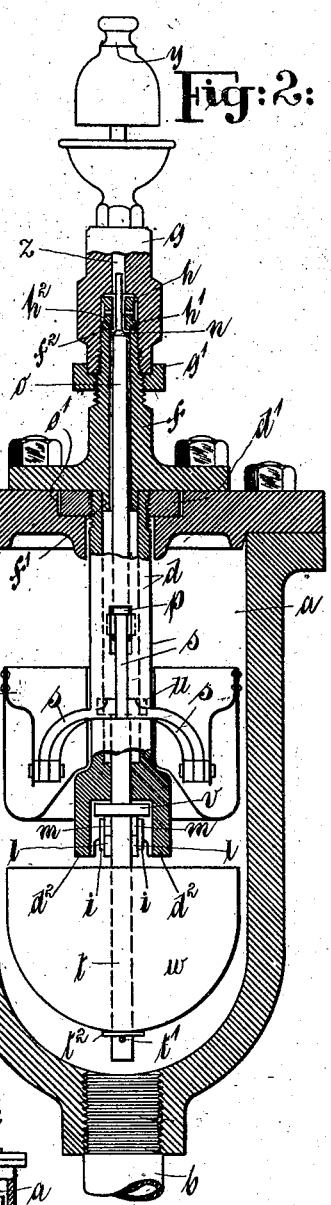
INVENTOR.
ARTHUR BUTLER
BY: Francis E. Royce
ATTORNEY Patented Feb. 8, 1927.

1,617,101

UNITED STATES PATENT OFFICE.

ARTHUR BUTLER, OF WATFORD, ENGLAND, ASSIGNOR TO RONALD TRIST & COMPANY, LIMITED, OF LONDON, ENGLAND.

ALARM DEVICE FOR INDICATING HIGH AND LOW LIQUID LEVEL.

Application filed April 25, 1924, Serial No. 709,068, and in Great Britain April 26, 1923.

This invention relates to improvements in alarm devices for indicating high and low liquid level and has for one of its objects a construction whereby all the parts of the device are accessible and are disposed outside of the container having the liquid therein, a further object being the provision of simple means whereby greater accuracy of operation, more compactness of construction and increased reliability of performance over a wider range of pressures is obtained as compared with known devices of like character.

The invention consists in the arrangement in combination of a chamber connected with the container for the liquid so that the level of the liquid in the chamber is in the plane of the level of the liquid in the container during operation, a cover for said chamber, a centrally arranged depending hollow member mounted on said cover, a stem within said member, a bucket float arranged symmetrically about the exterior of said member, toggle levers pivotally mounted in said member and connected to said float, arms on said toggle levers for transmitting the movement of the float to the stem, a rod within said member, levers pivotally mounted on the lower part of said member and engaging with said rod to transmit the movement of said rod to said float, a bucket float on said rod and means for externally indicating movements of the stem to produce a high and low liquid level alarm device.

Referring to the drawings, which form part of this specification,—

Figure 1 is a longitudinal section through an apparatus constructed in accordance with this invention.

Figure 2 is a longitudinal section through the apparatus shown in Figure 1 and is taken on the line 2—2 of that figure.

Figures 3, 4 and 5 are diagrammatic views illustrating the operation of the apparatus.

The chamber $a$ for the mechanism is located in suitable relation to the normal liquid level, the variation of which is to be indicated, and is connected by pipes $b$ and $c$ with the container of such liquid.

For the purposes of explanation it will be assumed that the liquid, the level of which is under observation, is under pressure in the container such for example as is usual in steam boilers and the like.

The space above the liquid in the container is connected to the space above the liquid in the chamber $a$ by the pipe $c$ whilst the liquid itself in the container can flow into the chamber $a$ through the pipe $b$ thus ensuring that the level of the liquid in the chamber $a$ is in the plane that contains the level of the liquid in the container and that the pressure in the container is the same as the pressure in the chamber $a$.

The chamber $a$ is provided with a cover $e$ having a centrally arranged hollow member $d$ depending therefrom into the chamber $a$, said member $d$ being supported in said cover $e$ by means of the screwed collar $d'$ which is located in the recess $e'$ of the cover $e$.

The cover $e$ has an upwardly extending hollow extension $f$ upon its upper surface, said hollow extension $f$ being coaxial with the hollow member $d$, and to ensure such coaxial arrangement being positively maintained at all times the extension $f$ has a spigot $f'$ for engagement with the bore of the member $d$.

The extension $f$ is fitted with a cap $g$ the internal surfaces of which are so formed as to receive a seating element $h$ and clamp said seating element $h$ in place upon the end of the extension $f$ when the parts are assembled.

To dispose the element $h$ so that the axis of its bore shall be accurately located relative to the axis of the extension $f$ the element $h$ is provided with a spigot $h'$ which engages with a recess $f^2$ formed in the upper end of the extension $f$.

In order that a pressure tight joint may be readily effected between the cap $g$ and the extension $f$ a locking or jointing nut $g'$ is provided.

The member $d$ at its lower end is provided with two pairs of projecting arms $d^2$; each pair of the arms $d^2$ support a lever $i$ which is pivoted at $k$ in said arms. The levers $i$ have antifriction rollers $l$ and $m$ at their respective extremities for purposes hereinafter to be more fully explained.

A stem $o$ is located within the extension $f$ and passes into the bore of the member $d$ for a certain distance. The stem $o$ has a valve face $n$ at its upper end for coaction with the valve seat $h^2$ formed in the element $h$ as illustrated while the lower end of the said stem $o$ is connected to the arm $q$ of the toggle levers $r$ pivoted at $p'$ in the member $d$, slots $p$ being formed in the member $d$ to allow the said arms $q$ to pass therethrough.

Bifurcated toggle links $s$ are pivotally connected to the free ends of the toggle levers $r$ and connect said toggle levers $r$ to the bucket float $x$; by this arrangement the stem $o$ is constrained to move in opposite direction to the bucket float $x$ when said float $x$ is longitudinally displaced.

A rod $t$ is fitted with a collar $v$ for engagement with the rollers $m$ and also with the bucket float $w$ which is supported in position by the pin $t'$ and washer $t^2$, the upper end of the rod $t$ having a guiding device $u$ for cooperation with the member $d$.

A second bucket float $x$ is disposed about the member $d$ above the projecting arms $d^2$ thereof, the lower part of said float $x$ being arranged to engage with the rollers $l$ of the levers $i$.

The pressure within the chamber $a$ is employed to operate an audible signal represented in the drawings by a whistle $y$. The whistle $y$ is mounted on the cap $q$ and supplied with fluid pressure through the passage $z$.

The device as a whole operates to give an alarm whenever the level changes more than a predetermined amount regardless of the nature of said change, that is to say, the alarm given irrespective of whether the level of the liquid rises or falls.

Figure 3 illustrates the position of the buckets $w$ and $x$ when the level of the liquid is at a predetermined height; both the buckets $w$ and $x$ are full of liquid, the force due to the effective immersed weight of the bucket $w$ being balanced by a part of the force exerted by the float $x$ and its contents through the levers $i$. Under these circumstances it will be seen that the valve $n$ is maintained against its seat $h^2$ by the remaining part of the force exerted by the float $x$ and its contents through the bifurcated toggle links $s$, toggle levers $r$, arms $q$ and stem $o$.

Figure 4 illustrates the position of the buckets $w$ and $x$ when the level of the liquid has risen above the predetermined height; as before both the buckets $w$ and $x$ are full of liquid the force due to the effective immersed weight of the bucket $w$ acting through the levers $i$ being sufficient to overcome the force due to the effective weight of the float $x$ and its contents as the said effective weight has been reduced by the partial immersion of the float $x$ in the rising liquid. Under these circumstances the float $x$ rises and withdraws the valve $n$ from off its seat $h^2$ through the intermediation of the links $s$, levers $r$, arms $q$ and stem $o$ with the result that fluid pressure passes through the passage $z$ to the whistle $y$ which is operated thereby to give an audible alarm.

Figure 5 illustrates the position of the buckets $w$ and $x$ when the level of the liquid has fallen below the predetermined height; as before, both the buckets $w$ and $x$ are full of liquid the force due to the effective immersed weight of the bucket $w$ acting through the levers $i$ being sufficient to overcome the force due to the effective weight of the float $x$ and its contents as the effective weight of the bucket $w$ has been increased owing to the level of the liquid having fallen. Under these circumstances the float $x$ rises and withdraws the valve $n$ from off its seat $h^2$ through the intermediation of the links $s$, levers $r$, arms $q$ and stem $o$ with the result that fluid pressure passes through the passage $z$ to the whistle $y$ which is again operated thereby to give an audible alarm.

I claim:

1. A high and low liquid level alarm device having in combination a chamber connected with the container for the liquid so that the level of the liquid in the chamber is in the plane of the level of the liquid in the container during operation, a cover for said chamber a centrally arranged depending hollow member mounted on said cover, a stem within said member, a bucket float arranged symmetrically about the exterior of said member, toggle levers pivotally mounted in said member and connected to said float, arms on said toggle levers for transmitting the movement of the float to the stem, a rod within said member, levers pivotally mounted on the lower part of said member and engaging with said rod to transmit the movement of said rod to said float, a bucket float on said rod and means for externally indicating movements of the stem.

2. In a high and low liquid level alarm device as claimed in claim 1 the arrangement of rollers on the ends of the levers for transmitting the movement of the rod to the first named float and means associated with the hollow member for guiding the movement of the rod.

3. In a high and low liquid level alarm device as claimed in claim 1 the arrangement of a valve face on the upper end of the stem, a valve seating for cooperation with said face, a hollow extension mounted on said cover for supporting said seating and enclosing said stem, a cap for retaining said seating in position, a signal device mounted on said cap for operation by the pressure in the chamber when the valve face recedes from the seating, rollers on the ends of the levers for transmitting the movement of the rod to the first named float and means associated with the hollow member for guiding the movement of the rod.

In testimony whereof I have signed my name to this specification.

ARTHUR BUTLER.